Nov. 2, 1971    B. H. TOWNSEND    3,616,595
AUTOMATIC FLANK STRAP RELEASE
Filed Oct. 15, 1969    2 Sheets-Sheet 1
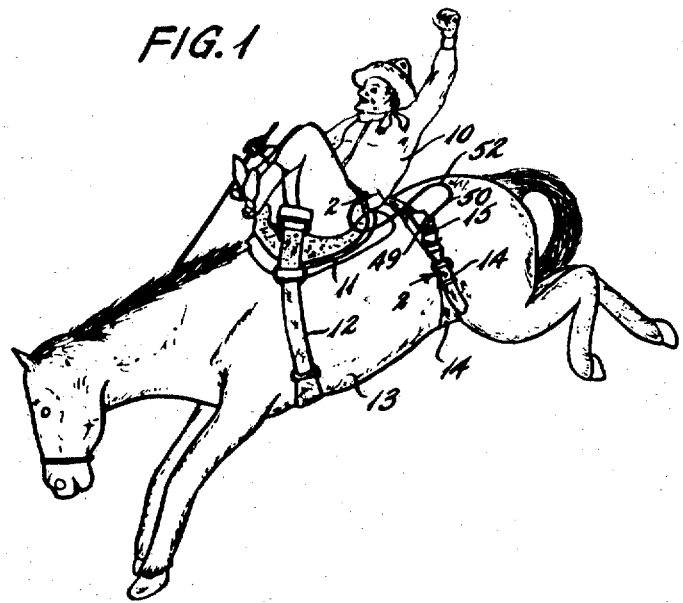
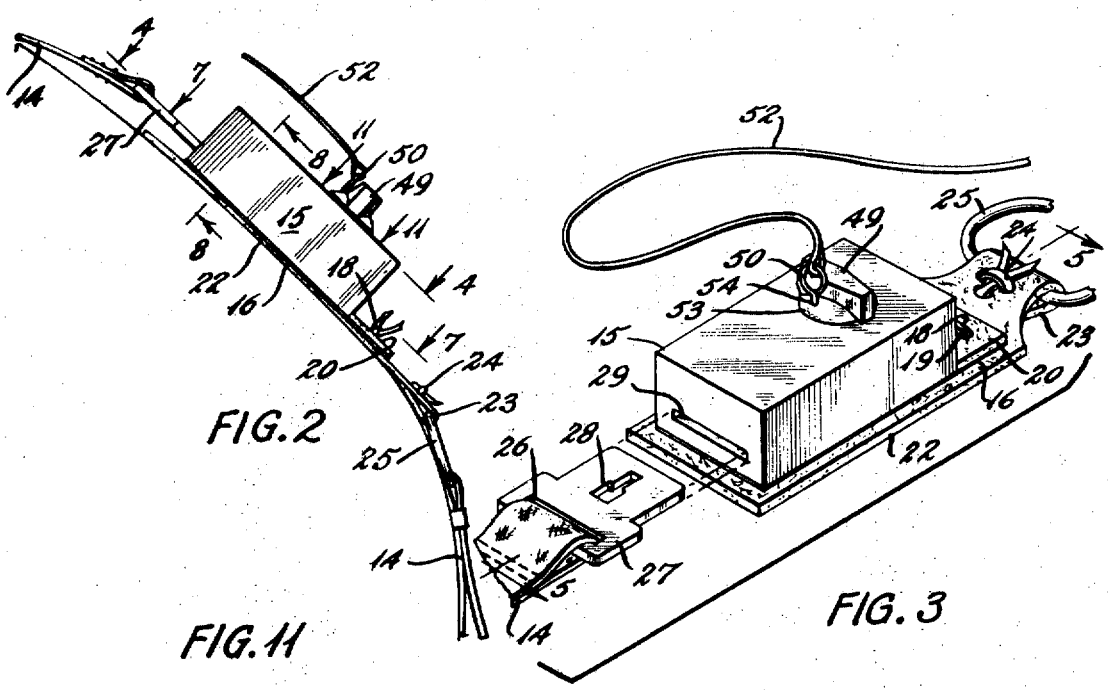
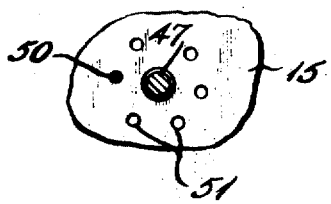
INVENTOR
BLUE H. TOWNSEND
BY
ATTORNEYS Nov. 2, 1971   B. H. TOWNSEND   3,616,595
AUTOMATIC FLANK STRAP RELEASE
Filed Oct. 15, 1969                              2 Sheets-Sheet 2
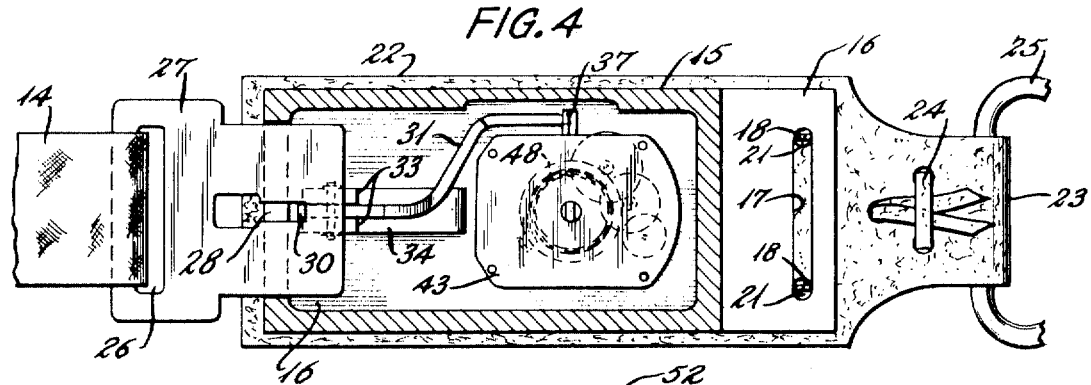
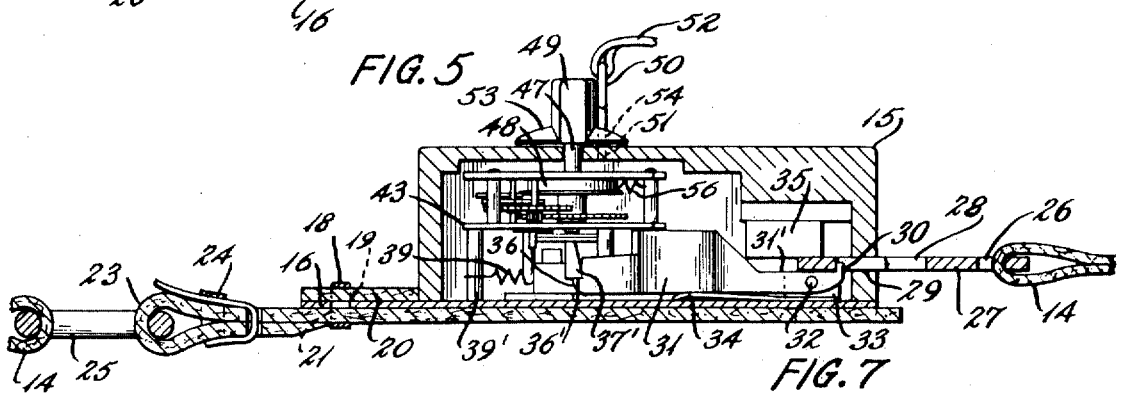
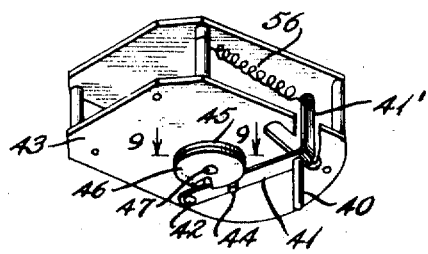
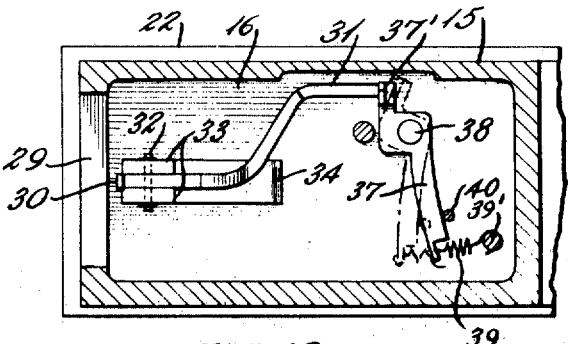
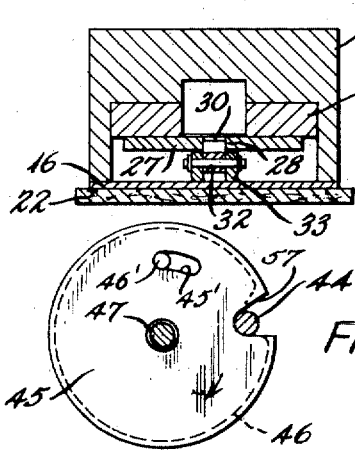
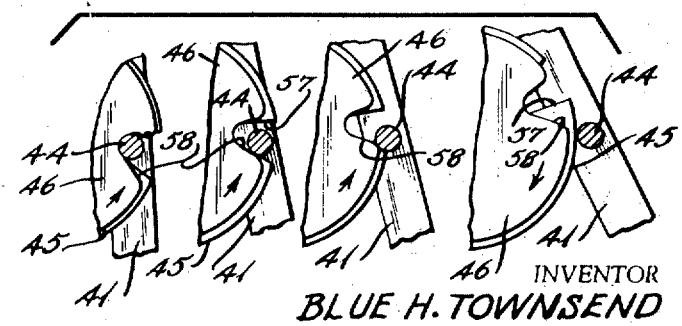
INVENTOR
BLUE H. TOWNSEND
BY
ATTORNEYS

United States Patent Office 3,616,595
Patented Nov. 2, 1971

3,616,595
AUTOMATIC FLANK STRAP RELEASE
Blue H. Townsend, 2400 N. 49th, Waco, Tex. 76710
Filed Oct. 15, 1969, Ser. No. 866,693
Int. Cl. B68b 1/00
U.S. Cl. 54—1                                                4 Claims

ABSTRACT OF THE DISCLOSURE

Flank strap release mechanism for automatically releasing a flank strap applied around the flanks of a horse or other animal, during a rodeo or other performance, to produce pressure and induce bucking of such animal, such release and the relieving of pressure resulting in the animal becoming calmer and consequently capturable. The release mechanism is a spring-actuated clock-type timer, the mainspring of which is adapted to be wound manually and held against unwinding by a release pin with a cord attached and adapted to be withdrawn by a rider of the animal or other person so that the flank strap will be released after the expiration of the time set.

BACKGROUND OF THE INVENTION

(1) Field of the invention

The invention relates generally to harness and related equipment used on rodeo stock, and especially to mechanism by which a flank strap applied to cause bucking of the animal may be released from the rodeo stock.

(2) Description of the prior art

Various types of straps and buckles or fasteners have been employed. These have not included satisfactory automatic release mechanisms for use with a flank strap on rodeo stock, although release mechanisms have been used for fastening belts of various kinds including seat belts of automobiles and other objects.

SUMMARY OF THE INVENTION AND OBJECTS

The automatic flank strap release of the present invention is a spring-actuated clock-type connector including a housing for connecting opposite ends of the flank strap. The housing has a bottom plate having one end adjustably attached to the flank strap and into the opposite end of such housing a tongue is releasably retained by a latch and held until it is released after a predetermined time. The latch is urged toward release position by a spring but is maintained against release from such locked position by locking mechanism adapted to be freed by means of a release pin with a cord attached thereto and adapted to be pulled and withdrawn from such position manually.

It is an object of the invention to provide an automatic flank strap release which may be readily applied and utilized effectively and reliably to release a flank strap from an animal after a predetermined time, with such flank strap release being of a construction to be set for a predetermined time and maintained in such position until a release pin is manually withdrawn to allow operation of the timing mechanism and resulting in the automatic release of the flank strap and pressure on the animal caused thereby.

BRIEF DESCRIPTION OF THE DRAWINGS

FIG. 1 is a perspective of a horse and rider and illustrating the use of the invention;

FIG. 2, a side elevation of a flank strap release mechanism viewed approximately on the line 2—2 of FIG. 1;

FIG. 3, an enlarged perspective of the automatic flank strap release;

FIG. 4, a horizontal section on the line 4—4 of FIG. 2;

FIG. 5, a longitudinal section on the line 5—5 of FIG. 3;

FIG. 6, a perspective of the underside of the timer illustrating the latch release mechanism;

FIG. 7, a horizontal section on the line 7—7 of FIG. 2;

FIG. 8, a transverse section on the line 8—8 of FIG. 2;

FIG. 9, a section on the line 9—9 of FIG. 6 illustrating the cam actuating means;

FIG. 10, a fragmentary detail view of the progressive steps between the unlatched and latched position of the timer, including the setting of the timer and the latching of the same at such set time; and FIG. 11, a horizontal section on the line 11—11 of FIG. 2.

DESCRIPTION OF THE PREFERRED EMBODIMENT

Referring to the drawings, a rider 10 is illustrated on a saddle 11, fastened by a girth 12, upon a horse 13. The animal is caused to buck by the pressure of a flank strap 14 around the flanks of the animal. It is well known that contests are held to determine the skill of riders at rodeos and the like, and flank straps are applied to induce vigorous bucking. After a ride is completed, in order to simplify catching the animal the release of the flank strap is desirable so that the animal will calm down and be easier to catch.

In order to cause release of the flank strap 14, an automatic flank strap release such as that of the present invention may be employed. Such release includes a housing 15 having a bottom plate 16 with one end provided with a slot 17 (FIG. 4) for receiving a thong or tie 18 (FIG. 2) which extends through a pair of spaced openings 19 (FIG. 3) in a keeper 20. The thong or tie 18 also extends through similar spaced openings 21 (FIG. 4) and an underlying mounting pad 22 of leather or the like with a soft undersurface for the protection of the animal.

One end of the pad 22 is provided with a reverse loop 23 in each of the opposed portions of which are three spaced openings 24 through which the ends of a thong or tie are inserted downwardly (FIG. 3) through a pair of such openings and then upwardly through the third opening and the free ends extended under the loop where they are held. In the looped end 23 of the pad 22 is secured a ring 25 adapted to be attached to the flank strap 14.

The other end of the flank strap extends through a slot 26 in a tongue or attaching plate 27 having a keyhole opening or slot 28. The tongue or plate 27 is adapted to be inserted in a slot 29 in the end of the housing 15 and detachably held in such housing by means of an upturned latching finger or extremity 30 extending into the key slot 28 of the tongue or plate 27. The finger 30 is part of a latch member 31 swingably mounted on a pivot 32 carried by lugs 33 attached to the lower plate 16. One end of the latch member 31 is urged toward unlatched position by a spring 34. The upper surface of the latch member 31 is provided with a camming portion 30' spaced from the finger 30 and on the opposite side of the pivot 32 from the finger for a purpose to be described later.

A pair of spaced backing plates 35 are disposed above the lugs 33 and in spaced relation thereto a distance sufficient to accommodate the thickness of the tongue 27. In order to maintain the latch 31 in latching position against the action of the spring 34, the end of the latch 31 remote from the finger 30 is provided with an arcuate cam surface 36 terminating in a shoulder 36' engageable by a depending lug 37' of a keeper 37. The keeper 37 is mounted on a generally vertical pivot 38 so that when rocked about its pivot it will free the latch 31. A spring 39 has one end attached to the keeper 37 and its other end attached about a stud 39' carried by the plate 16. Thus the depending lug 37' of the keeper 37 is urged into engagement with the latch member 31 by the spring 39.

In order to swing the keeper 37 about the pivot 38 and release the latch member 31, a pin 40 is carried by an actuating arm 41 having one end mounted on a pivot 42 on the bottom plate of a spring actuated clock-type timing mechanism 43. The opposite end of the arm 41 has an upwardly extending portion 41' connected by a spring 56 (FIG. 6) to one of the posts of the timing mechanism 43. A cam follower 44 carried by the arm 41 between the pin 40 and the pivot 42, is urged by the spring 56 into engagement with the periphery of a cam 45 located below the timing mechanism 43. The cam 45 has an arcuate slot 45' in which is received a pin 46' carried by an adjacent cam 46 and providing a lost motion connection therewith. The cam 45 is freely rotatably mounted on a central shaft 47 of the timing mechanism 43 while the cam 46, which is slightly smaller in diameter than the cam 45, is fixed to such shaft. The cam 45 has a tapered peripheral notch or recess 57 and the cam 46 has a corresponding tapered peripheral notch or recess 58 which is generally in registration with the notch 57 but can be moved slightly out of registration by the lost motion between the cams, as will be described later.

The timing mechanism 43 includes a main spring 48 fixed to the shaft 45 and adapted to drive the gear train of the timing mechanism 43. In order to set the timing mechanism for a desired length of time, a knob 49 is mounted on the upper end of the shaft 47 and such knob has a skirt 53 with an opening 54 therethrough. A series of openings 51 (FIG. 11) are provided in the top surface of the housing 15 and such openings are located in a position to be aligned with the opening 54 of the skirt. A pin 50 having a cord 52 attached to one end is provided which is adapted to extend through the opening 54 in the skirt 53 and into one of the openings 51 after the knob 49 has been rotated a desired amount to lock the knob and main spring in wound condition.

In the operation of the device, the knob 49 is rotated a desired amount so that the opening 54 is in alignment with one of the openings 51 of the housing, after which the pin 50 is inserted in the aligned openings to lock the knob in position. Rotation of the knob 49 causes rotation of the central shaft 47 and the timing mechanism 43, as well as the cam 46 mounted at the opposite end of such shaft. Rotation of the cam 46 will rotate the cam 45 by means of the pin 46' so that both cams will rotate substantially simultaneously to force the cam follower 44 out of the tapered notches 57 and 58 to the periphery of the cam 45, the cam follower being held in engagement with the periphery by the spring 56, as illustrated in FIG. 10. It is noted that the notches 57 and 58 are tapered to permit the cam follower 44 to move outwardly easily but due to the fact that the notches subsequently are moved slightly out of registration, the cam follower will pass a sharp corner and move radially into the notches.

Movement of the cam follower 44 out of the notches will swing the actuating arm 41 and move the pin 40 from the keeper release position. When the pin 40 is moved from the phantom line position of FIG. 7 to the full line position, the spring 49 will cause the keeper 37 to swing about the pivot 38 so that the depending lug 37' abuts the cam surface 36 of the latch member 31 since the cam surface 36 has been raised by the spring 34.

When the flank strap is applied to the animal, the tongue 27 is inserted through the slot 29 and the front part of the tongue passes over the finger 30 which has been retracted. After the leading portion of the tongue 27 passes the pivot 32, it will engage the camming portion 30' on the upper surface of the latch member 31 and cause the latch member to be rotated about the pivot 32 and against the tension of the spring 34, such tongue 27 bearing against the backing plates 35 to force the latch member 31 to swing about the pivot 32. The swinging of the latch member 31 will swing the arcuate cam surface 36 downwardly relative to the depending lug 37' of the keeper 37 until the shoulder 36' is located below the depending lug 37'. At this time the spring 39 will move the keeper 37 to the full line position shown in FIG. 7 with the depending lug 37' located above the shoulder 36' of the latch member 31. Simultaneously when the cam surface 36 and shoulder 36' are being lowered, the upturned latching finger 30 will be raised into the slot 28 of the tongue 27 to lock such tongue in position. The end of the cord 52 remote from the pin 50 is attached to the rider in any desired manner, as by clipping the cord to the rider's belt.

The flank strap is irritating to the animal and as soon as the gates of the chute are opened, the animal will begin to buck violently trying to unseat the rider and to rid itself of the irritation. When the rider leaves the saddle as a result of being thrown, or at the end of the prescribed time period, the cord attached to his belt will pull the pin 50 and permit the main spring 48 to operate the gearing of the timing mechanism. The timing mechanism will rotate the central shaft 47 and the cam 46 and move the pin 46' through the slot 45' of the cam 45 to provide a lost motion between the cams 45 and 46. In other words, during the initial movement of the cam 46, the cam 45 will remain in fixed position due to the frictional contact between the pin 40 and the periphery of the cam 45 to move the notches 57 and 58 slightly out of registration with each other, as illustrated at the right-hand end of FIG. 10. When the pin 46' has traversed the slot 45', the cams 45 and 46 will rotate together and move relative to the cam follower 44. When the cam follower reaches the notch 57, the spring 56 will move the actuating arm 41 inwardly until the cam follower 44 reaches the bottom of the notches 57 and 58. Movement of the cam follower into the recesses causes the pin 40 to move the keeper 37 to the dotted line position of FIG. 7 and to move the depending lug 37' away from the shoulder 36' of the latch member 31. When the depending lug 37' is removed, the spring 34 will swing the latch member 31 about the pivot 32 and release the finger 30 from the slot 28. With the removal of the finger, the tongue 27 is pulled out of the slot 29 due to the action of the animal and the flank strap is released. With the release of the flank strap, the irritation is removed from the animal and the animal immediately begins to calm down since both the rider and the irritation have been removed.

It will be apparent from the foregoing that a simple practical reliable flank strap release is provided which can be readily applied around the flanks of an animal and automatically released after a lapse of a selected interval.

What is claimed is:

1. Flank strap release mechanism for application to a horse comprising a housing connected to a flank strap and having an opening at one end, a clock type timing mechanism mounted within said housing and having a shaft extending outwardly thereof, means on said shaft for setting said timing mechanism to run a selected length of time, pin means releasably holding said setting means in fixed position, means adapted to connect said pin means to a rider, tongue means fixed to said flank strap and adapted to be inserted through said opening in the end of said housing, a latch member swingably mounted within said housing, said latch member having a cam surface in a position to be engaged by said tongue means for swinging said latch member to latching position, means on one end of said latch member for releasably engaging said tongue means in said latching position, a keeper swingably mounted within said housing and adapted to releasably engage the opposite end of said latch member in said latching position, spring means normally urging said keeper toward said latch member, and an actuating arm carried by said timing mechanism and adapted to move said keeper out of engagement with said latch member a predetermined length of time after said timing mechanism setting means is released, whereby when a rider leaves the horse said pin means releases the timing mechanism and after a predetermined length of time said actuating arm swings the keeper from said latch member and releases said tongue means.

2. The structure of claim 1 in which said timing mechanism includes a pair of concentric cams mounted on said shaft, one of said cams having a lost motion relative to the other cam, and said cams adapted to control said actuating arm.

3. The structure of claim 1 including second spring means normally urging said actuating arm toward said keeper.

4. The structure of claim 1 including means for urging said latch member toward unlatching position.

References Cited
UNITED STATES PATENTS

| | | | |
|---|---|---|---|
| 2,252,257 | 8/1941 | Harvey | 54—1 |
| 2,608,812 | 9/1952 | Hutchings | 54—1 |
| 3,505,979 | 4/1970 | Rosswag | 119—110 |

HUGH R. CHAMBLEE, Primary Examiner

U.S. Cl. X.R.

54—71